(12) United States Patent
Horn et al.

(10) Patent No.: US 9,215,220 B2
(45) Date of Patent: Dec. 15, 2015

(54) REMOTE VERIFICATION OF ATTRIBUTES IN A COMMUNICATION NETWORK

(75) Inventors: Guenther Horn, Munich (DE); Wolf-Dietrich Moeller, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 241 days.

(21) Appl. No.: 13/097,545

(22) Filed: Apr. 29, 2011

(65) Prior Publication Data
US 2011/0314289 A1 Dec. 22, 2011

(30) Foreign Application Priority Data

Jun. 21, 2010 (WO) .................. PCT/EP2010/058749
Sep. 17, 2010 (WO) .................. PCT/EP2010/063709

(51) Int. Cl.
*H04L 9/32* (2006.01)
*H04L 29/06* (2006.01)
(Continued)

(52) U.S. Cl.
CPC ........ *H04L 63/06* (2013.01); *H04L 9/08* (2013.01); *H04L 9/0816* (2013.01); *H04L 9/0819* (2013.01); *H04L 9/0838* (2013.01); *H04L 63/062* (2013.01); *H04W 12/04* (2013.01); *H04L 63/0823* (2013.01); *H04L 2463/061* (2013.01); *H04W 36/0055* (2013.01); *H04W 84/047* (2013.01)

(58) Field of Classification Search
CPC ............. H04L 9/08; H04L 9/32; H04L 63/06; H04L 63/08
USPC ........... 380/247–276, 247–30; 713/150–161, 713/168–181, 189–194
See application file for complete search history.

(56) References Cited

U.S. PATENT DOCUMENTS

2010/0111308 A1* 5/2010 Forsberg et al. ............... 380/278
2010/0115598 A1* 5/2010 Barriga et al. .................... 726/8
(Continued)

FOREIGN PATENT DOCUMENTS

JP 2002-290397 A 10/2002
JP 2004-260803 A 9/2004
(Continued)

OTHER PUBLICATIONS

Network Access Security in Next-Generation 3GPP Systems: A Tutorial by Sankaran et al; Publisher: IEEE; Year: 2009.*
(Continued)

*Primary Examiner* — Madhuri Herzog
(74) *Attorney, Agent, or Firm* — Squire Patton Boggs (US) LLP

(57) ABSTRACT

It is provided an apparatus, comprising property checking means configured to check whether a claimant property information received from a claimant device corresponds to a predefined claimant attribute; obtaining means configured to obtain a result, which is positive only if the claimant property information corresponds to the predefined claimant attribute as checked by the property checking means; key generation means configured to generate a first claimant intermediate key from a predefined claimant permanent key stored in the apparatus; supplying means configured to supply, to the claimant device, the first claimant intermediate key using a secured protocol, wherein at least one of the key generation means and the supplying means is configured to generate and to supply, respectively, the first claimant intermediate key only if the result is positive.

13 Claims, 8 Drawing Sheets

(51) Int. Cl.
H04L 9/08 (2006.01)
H04W 12/04 (2009.01)
H04W 36/00 (2009.01)
H04W 84/04 (2009.01)

(56) References Cited

U.S. PATENT DOCUMENTS

| | | | | |
|---|---|---|---|---|
| 2010/0166184 | A1* | 7/2010 | Wu | 380/270 |
| 2010/0316223 | A1* | 12/2010 | Blom et al. | 380/278 |
| 2011/0045799 | A1* | 2/2011 | Cofta | 455/411 |
| 2011/0091036 | A1* | 4/2011 | Norrman et al. | 380/44 |
| 2015/0208236 | A1* | 7/2015 | Xu et al. | 380/270 |

FOREIGN PATENT DOCUMENTS

| | | |
|---|---|---|
| JP | 2005-529525 A | 9/2005 |
| JP | 2008-547246 A | 12/2008 |
| JP | 2010-502119 A | 1/2010 |
| JP | 2013-537374 A | 9/2013 |
| RU | 2 378 770 C2 | 1/2010 |
| WO | 2006/085170 A1 | 8/2006 |
| WO | 2007/108114 A1 | 9/2007 |
| WO | 2008/082337 A1 | 7/2008 |
| WO | WO 2008113804 A1 * | 9/2008 |
| WO | 2008/153456 A1 | 12/2008 |
| WO | 2009/124234 A1 | 10/2009 |
| WO | 2012/035850 A1 | 3/2012 |

OTHER PUBLICATIONS

Mun, Hyeran, Kyusuk Han, and Kwangjo Kim. "3G-WLAN interworking: security analysis and new authentication and key agreement based on EAP-AKA." Wireless Telecommunications Symposium, 2009. WTS 2009. IEEE, 2009.*
ETSI TS 133 221 V9.0.0, Digital Cellular Telecommunications System (Phase 2+); Universal Mobile Telecommunications System (UMTS); LTE; Generic Authentication Architecture (GAA); (3GPP TS 33.221 Version 9.0.0 Release 9) Feb. 2010, 27 pages.
SA#59, "Living document on Key Security Issues of Relay Node Architectures", 3GPP TSG-SA3 (Security), S3-100656, revision of S3-100601, Jun. 4, 2010, 14 pages.
ITU: "Draft ITU-T Recommendation NGN Identity Management Mechanisms", Nov. 2009, 39 pages.
"Radio Equipment and Systems (RES); Trans-European Trunked Radio (TETRA); Voice plus Data (V+D); Part 7: Security", European Telecommunication Standard, ETS 300 392-7, Sep. 1995, 68 pages.
3GPP TR 33.817 V6.1.0, "3rd Generation Partnership Project; Technical Specification Group Service and System Aspects; Feasibility Study on (U)SIM Security Reuse by Peripheral Devices on Local Interfaces (Release 6)", Dec. 2004, 39 pages.
International Search Report and Written Opinion application No. PCT/EP2010/063709 dated May 4, 2011.
S3-100449, 3GPP TSG-SA3, Relay Node Security: residual threats on Un, a total of 2 pages.

3rd Generation Partnership Project; Technical Specification Group Service and System Aspects; Security of H(e)NB; (Release 8), 3GPP TR 33.820 V8.1.0, Jun. 2009.
3rd Generation Partnership Project; Technical Specification Group Radio Access Network; Evolved Universal Terrestrial Radio Access (E-UTRA); Relay architectures for E-UTRA (LTE-Advanced) (Release 9), 3GPP TR 36.806 V9.0.0, Mar. 2010.
3rd Generation Partnership Project; Technical Specification Group Services and System Aspects; 3GPP System Architecture Evolution (SAE); Security architecture (Release 9), 3GPP TS33.401 V9.3.1, Apr. 2010.
3rd Generation Partnership Project; Technical Specification Group Service and System Aspects; Network Domain Security (NDS); Authentication Framework (AF) (Release 9), 3GPP TS 33.310 V9.3.0, Jun. 2010.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), 3GPP TS36.300 V9.4.0, Jun. 2010.
3rd Generation Partnership Project; Technical Specification Group Radio Access network; Evolved Universal Terrestrial Radio Access (E-UTRA) and Evolved Universal Terrestrial Radio Access Network (E-UTRAN); Overall description; Stage 2 (Release 10), 3GPP TS36.300 V10.0.0, Jun. 2010.
Smart Cards; Secure channel between a UICC and an end-point terminal (Release 9), ETSI TS 102484 V9.0.0, Apr. 2010.
Summary of Email discussion [69#31] LTD: Relay configuration at startup / subframe reconfiguration, R2-102085, 3GPP TSG-RAN WG2, Apr. 12-16, 2010, Beijing China.
Living Document on "Key Security Issues of Relay Node architectures", S3-100656, SA3#60, Jun. 28-Jul. 2, 2010, Montreal Canada.
Living Document on "Key Security Issues of Relay Node Architectures", S3-1011106, 3GPP TSG-SA3 (Security), SA3#60bis, Sep. 27-29, 2010, Riga Latvia.
PCT/ISA/206, Annex to Form PCT/ISA/206 Communication Relating to the Results of the Partial International Search, International Application No. PCT/EP2010/063709, Feb. 24, 2011.
Living Document on "Key Security Issues of Relay Node architectures", S3-100896, 3GPP TSG-SA3 (Security), SA3#60, Jun. 28-Jul. 2, 2010, Montreal Canada, 33 pages.
Office Action mailed Jan. 8, 2014, issued in corresponding JP Patent Application No. 2013-514560.
3GPP TS33.401 V9.4.0 (Jun. 2010); 3rd Generation Partnership Project; Technial Specification Group Services and System Aspects; 3GPP System Architecture Evolution (SAE); Security architecture (Release 9).
M. Myers et al. Network Working Group; Request for Comments: 2560, "X.509 Internet Public Key Infrastructure Online Certificate Status Protocol—OCSP" Jun. 1999.
Office Action mailed Oct. 20, 2014 issued in corresponding JP Patent Application No. 2013-514560 (English translation only).
Decision to Grant dated Aug. 11, 2015, issued in corresponding RU Patent Application No. 2013117261/08.

* cited by examiner

REMOTE VERIFICATION OF ATTRIBUTES IN A COMMUNICATION NETWORK

FIELD OF THE INVENTION

The present invention relates to an apparatus, a method, a system, and a computer program product related to remote verification of attributes in a communication network. More particularly, the present invention relates to an apparatus, a method, a system, and a computer program product for remote verification of attributes of a relay node in a communication network.

BACKGROUND OF THE INVENTION

The Evolved Packet System (EPS) is known by the brand name long term evolution (LTE) network. It comprises the E-UTRAN Radio Access network and the Evolved Packet Core (EPC). The $3^{rd}$ generation partnership program (3GPP) is in the process of defining an enhancement to the evolved packet system that introduces so-called Relay Nodes (RNs) into the EPS architecture. An EPS architecture including RNs is also called a (EPS) Relay Node Architecture. A particular EPS Relay Node Architecture has been selected by 3GPP for further elaboration. This selected architecture is documented in 3GPP technical specification (TS) 36.806, cf. ftp://ftp.3gpp.org/Specs/html-info/36806.htm, where it is called "alternative 2". Further documentation can be found in 3GPP TS 36.300, cf. ftp://ftp.3gpp.org/Specs/html-info/36300.htm. An overview of this architecture is depicted in FIG. 1, which is taken from 3GPP TS 36.300 v10.0.0 (FIG. 4.7.2-1), and is explained in the following:

An RN is a base station that relays traffic between a User Equipment (UE) and another base station (evolved NodeB, eNB), the donor base station (DeNB). Both the Uu interface between the UE and the RN and the Un interface between the RN and the DeNB are radio interfaces. Uu and Un are very similar. The Uu interface between a UE and an eNB in an EPS architecture without relay nodes is identical to an Uu interface between a UE and an RN, i.e. the UE is not aware of the presence of the RN.

An RN has two faces: towards the UE it acts as an eNB; and towards the DeNB it acts like a UE. The UE characteristics of an RN come into play in particular when the connections over the radio interface Un are established during the so-called RN start-up phase, cf. 3GPP document R2-102085, available at http://www.3gpp.org/ftp/tsg ran/WG2 RL2/TSGR2 69bis/Docs/R2-102085.zip. The RN attaches to the network, and the radio bearers on Un between the RN and its DeNB are established in the same way in which a UE attaches to the network and establishes radio bearers over the Uu interface between the UE and an eNB.

Consequently, there is a mobility management entity (MME) that sees the RN in its role as a UE and is active in particular during the RN start-up phase. This MME is called the Relay UE's MME, or MME-RN for short. The MME-RN authenticates the RN during the start-up phase and usually interacts with the home subscriber server (HSS) for this purpose. The HSS contains the subscription data of the RN in its UE-role.

Like a proper UE, the RN also contains a universal subscriber identity module (USIM) on a universal integrated circuit card (UICC) to enable authentication. In order to distinguish this USIM from the ones inserted in a UE, it is called USIM-RN (not shown in FIG. 1). The security keys for protecting signaling and user plane on the Un interface and for protecting non-access stratum (NAS) signaling between RN and MME-RN may be derived as defined for EPS without relay nodes, or may be suitably modified.

The introduction of relay nodes into the EPS architecture creates new security challenges. The state of the security discussion in 3GPP in July 2010 can be found in 3GPP document S3-100896, available at http://www.3gpp.mobi/ftp/tsg sa/WG3 Security/TSGS3 60 Montrea 1/Docs/

When a relay node (RN) attaches to the donor base station (DeNB) in the E-UTRAN, the Mobility Management Entity for Relay Nodes (MME-RN) in the EPC that controls the DeNB needs to verify whether the entity requesting to be attached belongs to the class of relay nodes and satisfies certain properties (attributes) required of a relay node, in particular the execution of certain RN-specific functions in a secure environment on the RN and the integrity of the RN platform (i.e. correctness of Hardware (HW) and Software (SW)).

However, the MME-RN according to the present technical specifications does not have the means to verify the required RN attributes directly.

As one way to solve this problem, one might enhance the functionality of the relevant network nodes, such as DeNB and MME-RN, with functionality enabling them to perform this verification of the attributes of the RN directly. Such a solution was published by 3GPP in document S3-100896, retrievable from http://www.3gpp.mobi/ftp/tsg sa/WG3 Security/TSGS3 60 Montrea 1/Docs/. According to S3-100896, the DeNB and the MME-RN may be enhanced with specific functionality using certificates.

Another solution to the problem according to unpublished patent application PCT/EP2010/058749 enhances the solution in section 7.5 of S3-100896 in that the keys for protecting the access stratum on the Un interface are obtained from the USIM-RN via a secure channel.

SUMMARY OF THE INVENTION

It is an object of the present invention to improve the prior art.

In particular, it is understood that it would be desirable from a network migration point of view that the network entities are left as much as they are in today's LTE networks.

This is possible if an entity close to the RN performs the required verification of the attributes of the RN, and if procedures according to today's standards are used to convey the fact of a successful verification to the MME-RN and the DeNB.

This problem in relay enhanced EPS may occur correspondingly in an arbitrary communication network:

According to a first aspect of the invention, there is provided an apparatus, comprising property checking means configured to check whether a claimant property information received from a claimant device corresponds to a predefined claimant attribute; obtaining means configured to obtain a result, which is positive only if the claimant property information corresponds to the predefined claimant attribute as checked by the property checking means; key generation means configured to generate a first claimant intermediate key from a predefined claimant permanent key stored in the apparatus; supplying means configured to supply, to the claimant device, the first claimant intermediate key using a secured protocol, wherein at least one of the key generation means and the supplying means is configured to generate and to supply, respectively, the first claimant intermediate key only if the result is positive.

In the apparatus the secured protocol may be a cryptographic protocol based on a certificate.

The apparatus may further comprise certificate checking means configured to check whether the certificate is valid, and wherein the obtaining means may be additionally configured to obtain the positive result only if the certificate is valid.

In the apparatus, the claimant property information may be comprised in the certificate.

The apparatus may further comprise secure storing means configured to securely store at least one of a key of the secured protocol and the claimant permanent key such that the securely stored key may not be extracted from the apparatus without a corresponding authorization.

In the apparatus, the key generation means may be configured to generate the first claimant intermediate key using an authentication and key agreement protocol.

According to a second aspect of the invention, there is provided a tamper resistant module comprising an apparatus according to the first aspect.

According to a third aspect of the invention, there is provide an apparatus, comprising property information supplying means configured to supply a claimant property information of the apparatus to an evaluation device using a secured protocol; establishing means configured to establish a communication with an enforcement device different from the evaluation device based on an effective claimant session key, wherein the effective claimant session key is based on a first claimant intermediate key received from the evaluation device.

In the apparatus, the secured protocol may be a cryptographic protocol based on a certificate.

In the apparatus, the claimant property information is comprised in the certificate.

In the apparatus, the claimant property information may comprise information whether or not at least one of the following items is fulfilled: a presence of a secure storing means in the apparatus, wherein the secure storing means is configured to securely store a key of the secured protocol such that the key may not be extracted from the apparatus without a corresponding authorization; an ability to perform an autonomous platform validation ensuring the integrity of a hardware and a software of the apparatus; and a predefined functionality apart from the presence and the ability is provided by the apparatus.

The apparatus may further comprise key generation means configured to generate an effective claimant session key from the first claimant intermediate key, and wherein the establishing means may be configured to establish the communication with the enforcement device using the effective claimant session key.

The apparatus may be configured to protect the communication with the enforcement device based on the effective claimant session key.

According to a fourth aspect of the invention, there is provided a relay node, comprising an apparatus according to the third aspect of the invention.

According to a fifth aspect of the invention, there is provided an apparatus, comprising verification means configured to verify whether a received device class information corresponds to a predefined device class; obtaining means configured to obtain a result, which is positive only if the device class information corresponds to the predefined device class as checked by the verification means; key generation means configured to generate a second claimant session key from a second claimant intermediate key stored in the apparatus; supplying means configured to supply the second claimant session key and the result to an enforcement device, wherein at least one of the key generation means and the supplying means is configured to generate and to supply, respectively, the second claimant session key only if the result is positive.

According to a sixth aspect of the invention, there is provide an apparatus, comprising establishing means configured to establish, with a claimant, a communication, which requires that a second claimant session key received from a verification device corresponds to an effective claimant session key of the claimant, wherein the verification device is different from the claimant, and granting means configured to grant access to a communication resource for the claimant only if a result received from the verification device is positive and if the establishing means established the communication.

The apparatus may further comprise key generation means configured to generate a third claimant session key from the second claimant session key, and wherein the communication may require that the third claimant session key matches the effective claimant session key.

According to a seventh aspect of the invention, there is provided a system, comprising an evaluation apparatus comprising an apparatus according to the first aspect; a claimant apparatus comprising an apparatus according to the third aspect; a verification apparatus; and an enforcement apparatus; wherein the evaluation apparatus, the claimant apparatus, and the verification apparatus are mutually different from each other; the enforcement apparatus is different from the evaluation apparatus and the claimant apparatus; and wherein the verification apparatus comprises a key generation means configured to generate a second claimant session key from a second claimant intermediate key stored in the verification apparatus, and a supplying means configured to supply the second claimant session key to the enforcement apparatus; the enforcement apparatus comprises an establishing means configured to establish, with the claimant apparatus, a communication, which requires that the second claimant session key received from the verification apparatus corresponds to the effective claimant session key of the claimant apparatus, and a granting means configured to grant access to a communication resource for the claimant apparatus only if the establishing means established the communication; the claimant apparatus comprises the claimant device of the evaluation apparatus; the evaluation apparatus comprises the evaluation device of the claimant apparatus; the claimant property information supplied by the claimant apparatus corresponds to the claimant property information received by the evaluation apparatus; the first claimant intermediate key supplied by the evaluation apparatus corresponds to the first claimant intermediate key received by the claimant apparatus; and the secured protocol of the evaluation apparatus is the same as the secured protocol of the claimant apparatus.

In the system, at least one of the following may be fulfilled: the verification device comprises an apparatus according to the fifth aspect, and the enforcement device comprises an apparatus according to the sixth aspect.

According to the eighth aspect, there is provided a method, comprising checking whether a claimant property information received from a claimant device corresponds to a predefined claimant attribute; obtaining a result, which is positive only if the claimant property information corresponds to the predefined claimant attribute as checked in the checking step; generating a first claimant intermediate key from a predefined claimant permanent key stored in an apparatus performing the method; supplying, to the claimant device, the first claimant intermediate key using a secured protocol, wherein at least one of the generating and the supplying is performed only if the result is positive.

In the method, the secured protocol may be a cryptographic protocol based on a certificate.

The method may further comprise checking whether the certificate is valid, and wherein the result of the obtaining may be positive result only if the certificate is valid.

In the method, the claimant property information may be comprised in the certificate.

The method may further comprise securely storing at least one of a key of the secured protocol and the claimant permanent key such that the securely stored key may not be extracted from an apparatus performing the method without a corresponding authorization.

In the method, the generating the first claimant intermediate key may use an authentication and key agreement protocol.

The method may be an evaluation method.

According to a ninth aspect of the invention, there is provided a method, comprising supplying a claimant property information of an apparatus performing the method to an evaluation device using a secured protocol; establishing communication with an enforcement device different from the evaluation device based on an effective claimant session key, wherein the effective claimant session key is based on a first claimant intermediate key received from the evaluation device.

In the method, the secured protocol may be a cryptographic protocol based on a certificate.

In the method, the claimant property information may be comprised in the certificate.

In the method, the claimant property information may comprise information whether or not at least one of the following items is fulfilled: a presence of a secure storing means in the apparatus, wherein the secure storing means is configured to securely store a key of the secured protocol such that the key may not be extracted from the apparatus without a corresponding authorization; an ability to perform an autonomous platform validation ensuring the integrity of a hardware and a software of the apparatus; and a predefined functionality apart from the presence and the ability is provided by the apparatus.

The method may further comprise generating an effective claimant session key from the first claimant intermediate key, and wherein the establishing may use the effective claimant session key to establish the communication with the enforcement device.

The method may further comprise protecting the communication with the enforcement device based on the effective claimant session key.

The method may be a claimant method.

According to a tenth aspect of the invention, there is provided a method, comprising verifying whether a received device class information corresponds to a predefined device class; obtaining a result, which is positive only if the device class information corresponds to the predefined device class as checked in the verifying step; generating a second claimant session key from a second claimant intermediate key stored in an apparatus performing the method; supplying the second claimant session key and the result to an enforcement device, wherein at least one of the generating and the supplying is performed only if the result is positive.

The method may be a verification method.

According to an eleventh aspect of the invention, there is provided a method, comprising establishing, with a claimant, a communication, which requires that a second claimant session key received from a verification device corresponds to an effective claimant session key of the claimant, wherein the verification device is different from the claimant, and granting access to a communication resource for the claimant only if a result received from the verification device is positive and if the communication is established.

The method may further comprise generating a third claimant session key from the second claimant session key, and wherein the communication may require that the third claimant session key matches the effective claimant session key.

The method may be an enforcement method.

According to a twelfth aspect of the invention, there is provided a method, comprising performing an evaluation method, by an evaluation apparatus, comprising a method according to the eighth aspect; performing a claimant method, by a claimant apparatus, comprising a method according to the ninth aspect; performing a verification method by a verification apparatus; and performing an enforcement method by an enforcement apparatus; wherein the evaluation apparatus, the claimant apparatus, and the verification apparatus are mutually different from each other; the enforcement apparatus is different from the evaluation apparatus and the claimant apparatus; and wherein the verification method comprises generating a second claimant session key from a second claimant intermediate key stored in the verification apparatus, and supplying the second claimant session key to the enforcement apparatus; the enforcement method comprises establishing, with the claimant apparatus, a communication, which requires that the second claimant session key received from the verification apparatus corresponds to the effective claimant session key of the claimant apparatus, and granting access to a communication resource for the claimant apparatus only if the communication is established; the claimant method comprises the claimant device of the evaluation method; the evaluation method comprises the evaluation device of the claimant method; the claimant property information supplied by the claimant apparatus corresponds to the claimant property information received by the evaluation apparatus; the first claimant intermediate key supplied by the evaluation apparatus corresponds to the first claimant intermediate key received by the claimant apparatus; and the secured protocol of the evaluation apparatus is the same as the secured protocol of the claimant apparatus.

In the method, at least one of the following may be fulfilled: the verification method comprises a method according to the tenth aspect, and the enforcement method comprises a method according to the eleventh aspect.

The method may be a method of remote verification.

According to a thirteenth aspect of the invention, there is provided a computer program product comprising computer-executable components which perform, when the program is run on a computer, the execution of which result in operations of the method according to any of the eighth to twelfth aspect.

The computer program product may be embodied as a computer-readable storage medium.

According to a fourteenth aspect of the invention, there is provided an apparatus, comprising property checking processor configured to check whether a claimant property information received from a claimant device corresponds to a predefined claimant attribute; obtaining processor configured to obtain a result, which is positive only if the claimant property information corresponds to the predefined claimant attribute as checked by the property checking processor; key generation processor configured to generate a first claimant intermediate key from a predefined claimant permanent key stored in the apparatus; supplying processor configured to supply, to the claimant device, the first claimant intermediate key using a secured protocol, wherein at least one of the key generation processor and the supplying processor is configured to generate and to supply, respectively, the first claimant intermediate key only if the result is positive.

In the apparatus the secured protocol may be a cryptographic protocol based on a certificate.

The apparatus may further comprise certificate checking processor configured to check whether the certificate is valid, and wherein the obtaining processor may be additionally configured to obtain the positive result only if the certificate is valid.

In the apparatus, the claimant property information may be comprised in the certificate.

The apparatus may further comprise a secure storage configured to securely store at least one of a key of the secured protocol and the claimant permanent key such that the securely stored key may not be extracted from the apparatus without a corresponding authorization.

In the apparatus, the key generation processor may be configured to generate the first claimant intermediate key using an authentication and key agreement protocol.

According to a fifteenth aspect of the invention, there is provided a tamper resistant module comprising an apparatus according to the fourteenth aspect.

According to a sixteenth aspect of the invention, there is provide an apparatus, comprising property information supplying processor configured to supply a claimant property information of the apparatus to an evaluation device using a secured protocol; establishing processor configured to establish a communication with an enforcement device different from the evaluation device based on an effective claimant session key, wherein the effective claimant session key is based on a first claimant intermediate key received from the evaluation device.

In the apparatus, the secured protocol may be a cryptographic protocol based on a certificate.

In the apparatus, the claimant property information is comprised in the certificate.

In the apparatus, the claimant property information may comprise information whether or not at least one of the following items is fulfilled: a presence of a secure storage in the apparatus, wherein the secure storage is configured to securely store a key of the secured protocol such that the key may not be extracted from the apparatus without a corresponding authorization; an ability to perform an autonomous platform validation ensuring the integrity of a hardware and a software of the apparatus; and a predefined functionality apart from the presence and the ability is provided by the apparatus.

The apparatus may further comprise key generation processor configured to generate an effective claimant session key from the first claimant intermediate key, and wherein the establishing processor may be configured to establish the communication with the enforcement device using the effective claimant session key.

The apparatus may be configured to protect the communication with the enforcement device based on the effective claimant session key.

According to a seventeenth aspect of the invention, there is provided a relay node, comprising an apparatus according to the sixteenth aspect of the invention.

According to an eighteenth aspect of the invention, there is provided an apparatus, comprising verification processor configured to verify whether a received device class information corresponds to a predefined device class; obtaining processor configured to obtain a result, which is positive only if the device class information corresponds to the predefined device class as checked by the verification processor; key generation processor configured to generate a second claimant session key from a second claimant intermediate key stored in the apparatus; supplying processor configured to supply the second claimant session key and the result to an enforcement device, wherein at least one of the key generation processor and the supplying processor is configured to generate and to supply, respectively, the second claimant session key only if the result is positive.

According to a nineteenth aspect of the invention, there is provide an apparatus, comprising establishing processor configured to establish, with a claimant, a communication, which requires that a second claimant session key received from a verification device corresponds to an effective claimant session key of the claimant, wherein the verification device is different from the claimant, and granting processor configured to grant access to a communication resource for the claimant only if a result received from the verification device is positive and if the establishing processor established the communication.

The apparatus may further comprise key generation processor configured to generate a third claimant session key from the second claimant session key, and wherein the communication may require that the third claimant session key matches the effective claimant session key.

According to a twentieth aspect of the invention, there is provided a system, comprising an evaluation apparatus comprising an apparatus according to the fourteenth aspect; a claimant apparatus comprising an apparatus according to the fifteenth aspect; a verification apparatus; and an enforcement apparatus; wherein the evaluation apparatus, the claimant apparatus, and the verification apparatus are mutually different from each other; the enforcement apparatus is different from the evaluation apparatus and the claimant apparatus; and wherein the verification apparatus comprises a key generation processor configured to generate a second claimant session key from a second claimant intermediate key stored in the verification apparatus, and a supplying processor configured to supply the second claimant session key to the enforcement apparatus; the enforcement apparatus comprises an establishing processor configured to establish, with the claimant apparatus, a communication, which requires that the second claimant session key received from the verification apparatus corresponds to the effective claimant session key of the claimant apparatus, and a granting processor configured to grant access to a communication resource for the claimant apparatus only if the establishing processor established the communication; the claimant apparatus comprises the claimant device of the evaluation apparatus; the evaluation apparatus comprises the evaluation device of the claimant apparatus; the claimant property information supplied by the claimant apparatus corresponds to the claimant property information received by the evaluation apparatus; the first claimant intermediate key supplied by the evaluation apparatus corresponds to the first claimant intermediate key received by the claimant apparatus; and the secured protocol of the evaluation apparatus is the same as the secured protocol of the claimant apparatus.

In the system, at least one of the following may be fulfilled: the verification device comprises an apparatus according to the eighteenth aspect, and the enforcement device comprises an apparatus according to the nineteenth aspect.

It is to be understood that any of the above modifications can be applied singly or in combination to the respective aspects to which they refer, unless they are explicitly stated as excluding alternatives.

In a general communication network, for example, four entities may be involved in a procedure according to the invention:

A claimant (Cla), requesting a network resource, the Cla being a member of a class of entities defined by a set of attributes;

A remote verification entity (RVE), which needs to decide on the admissibility of the resource request based on the class membership of the Cla, but is unable to directly verify the attributes required of the Cla;

A local verification entity (LVE), which performs the required verification of the attributes of the Cla;

An enforcement point (EnP), which ensures that only admissible claimants obtain resources.

In embodiments according to the invention, at least some of the following problems are solved in particular:

a) identifying examples of a suitable local verification entity (LVE);
b) identifying the means by which the LVE can verify the attributes of the Cla;
c) conveying the fact of a successful verification of the RN attributes from the LVE to the RVE by suitable protocol means available between LVE and RVE from other contexts already;
d) enabling the EnP to enforce that only admissible claimants can indeed obtain resources.

The solution might have the additional benefit that the RVE, which may be an MME-RN, is off-loaded.

If these problems of a general communication network are related to embodiments of remote verification of a relay node, the above mentioned solved problems read as follows:

a) identifying a suitable local verification entity (LVE);
b) identifying the means by which the LVE can verify the attributes of the RN;
c) conveying the fact of a successful verification of the RN attributes from the LVE to the MME-RN
d) enabling the DeNB to enforce that only genuine members of the class of relay nodes can indeed attach as relay nodes.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Figure 1:
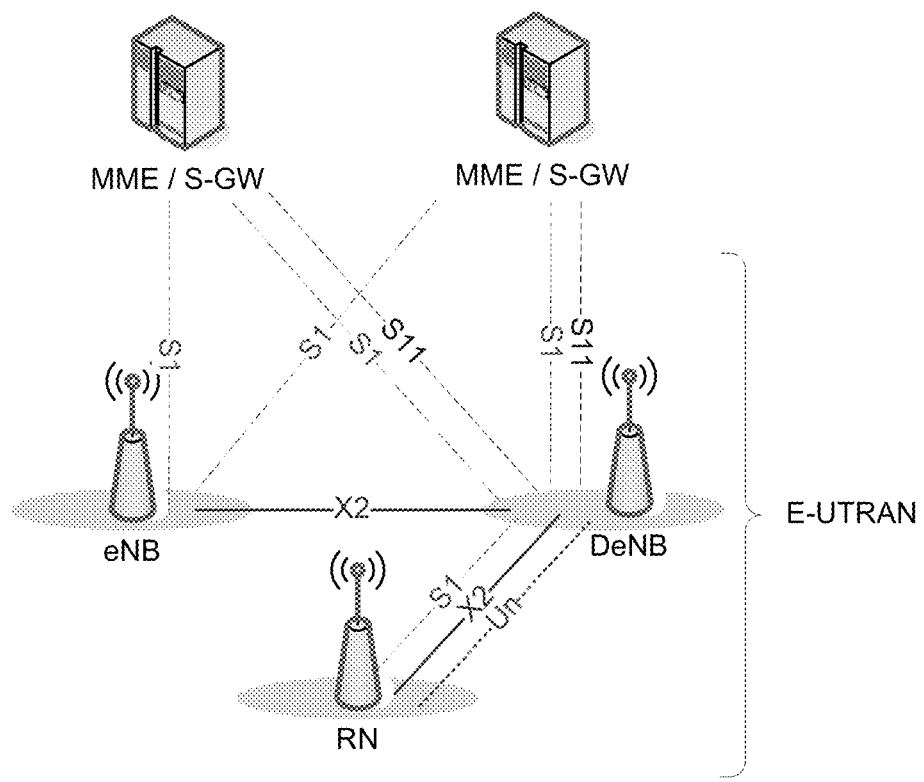
FIG. 1 shows an EPS architecture according to 3GPP TS 36.300 v10.0.0.
Figure 2:
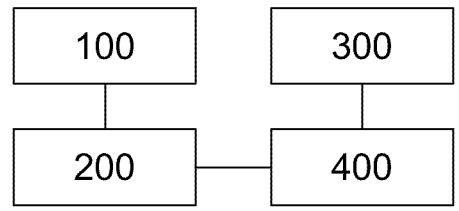
FIG. 2 shows a system according to an embodiment of the invention.

As shown in FIG. 2, a system according to an embodiment of the invention may comprise a local verification entity (LVE) 100, a claimant (Cla) 200, a remote verification entity (RVE) 300, and an enforcement point (EnP) 400. LVE 100 and Cla 200 are operably connected to each other, and RVE 300 and EnP 400 are operably connected to each other. In addition, when a method according to an embodiment of the invention was successfully performed, Cla 200 and EnP 400 are operably connected to each other.

Note that the operable connections shown in FIG. 2 are functional connections. Physical connections on which the functional connections rely may differ from the latter.

In addition, the blocks 100, 200, 300, and 400 of FIG. 2 are functional blocks. LVE 100, Cla 200, and RVE 300 differ mutually from each other. EnP 400 is different from LVE 100 and Cla 200. In some embodiments, EnP 400 is different from RVE 300, whereas in other embodiments, they belong to the same functional block. Functional blocks may be different if they are differently addressed in the communication network.

Each of LVE 100, Cla 200, RVE 300, and EnP 400 may be based on a different hardware, or some or all of the entities may be based on the same hardware.

Figure 3:
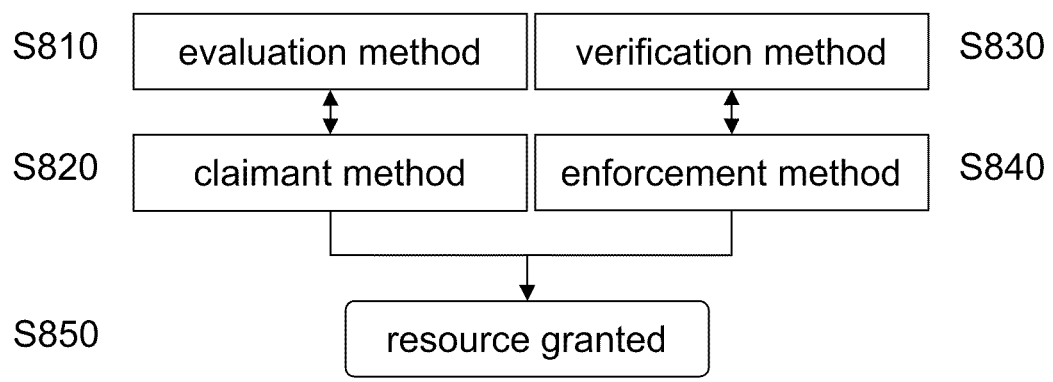
FIG. 3 shows a method according to an embodiment of the invention.

FIG. 3 shows a method according to an embodiment of the invention.

According to step S810, an evaluation method is performed by an LVE 100. The evaluation method interacts with a claimant method S820 of a claimant 200.

In parallel, a verification method S830 is performed by an RVE 300. The verification method interacts with enforcement method S840 of an EnP 400.

If steps S810, S820, S830, and S840 run successfully, a resource will be granted to the claimant 200 by the enforcement point 400 (step S850).

More details of each of the methods according to steps S810, S820, S830, and S840 will be given below with respect to FIGS. 8 to 11.

Seen from another perspective, more focussing on the mutual interactions, a method according to an embodiment of the invention may work as described by the combined steps 1.1 through 1.5:

1.1 When the claimant (Cla), being a member of a class C of entities defined by a set of attributes, intends to request a network resource controlled by the remote verification entity (RVE), the Cla first establishes a secure connection with a local verification entity (LVE). In the course of the establishment of this connection, the LVE authenticates the Cla and verifies that Cla is a member of C by checking its attributes. These steps are comprised in steps S810 and S820 of FIG. 3.

1.2 The verification method of the RVE may be triggered e.g. by a request for a resource from the Cla. When the RVE, which needs to decide on the admissibility of the resource request based on the class membership of the Cla, receives such a request, it runs an authentication and key agreement protocol with the LVE, which results in the establishment of session keys that are mutually shared between LVE and RVE. These steps are comprised in steps S810 and S830 of FIG. 3.

1.3 The LVE forwards the session keys, or any derivatives thereof, to the Cla only if the class membership verification in step 1.1 was successful. This step is comprised in steps S810 and S820 of FIG. 3.

1.4 The RVE forwards the session key, or any derivatives thereof, to the EnP indicating that they are suitable for enforcing resource requests of claimants of class C. This step is comprised in steps S830 and S840 of FIG. 3.

1.5 The EnP admits the resource request by the Cla only if it can verify through suitable protocol means that the Cla is in possession of the session keys. This step is comprised in steps S820 and S840 of FIG. 3.

In the following, the entities LVE, Cla, RVE, and EnP are described in greater detail.

Figure 4:
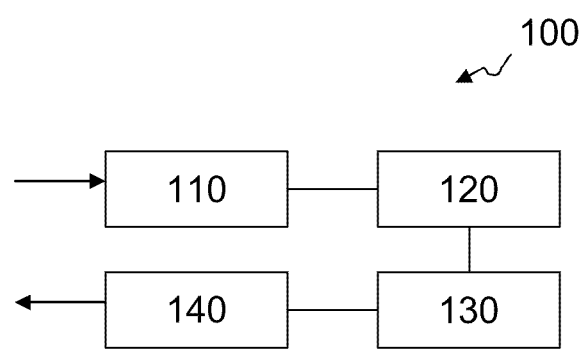
FIG. 4 shows an LVE according to an embodiment of the invention.

FIG. 4 shows an embodiment of an LVE 100 according to the invention.

According to FIG. 4, a property checking means 110 checks, whether a property information received from a claimant corresponds to a predefined attribute. For example, the property checking means may check whether or not the claimant belongs to the class of relay nodes.

The obtaining means obtains a positive result only if the property checking means verified that the received property information belongs to the predefined class. Alternatively to a positive result, a flag may be set to true, or another logically equivalent condition may be fulfilled.

The key generation means 130 generates a key (first claimant intermediate key) from a predefined key stored in the LVE. Preferably, the predefined key is permanently stored in the LVE in a tamper resistant way.

The supplying means 140 supplies the generated key to the claimant.

At least one of the key generation means 130 and the supplying means 140 generates and supplies, respectively, only if the result obtained by the obtaining means 120 is positive.

Figure 5:
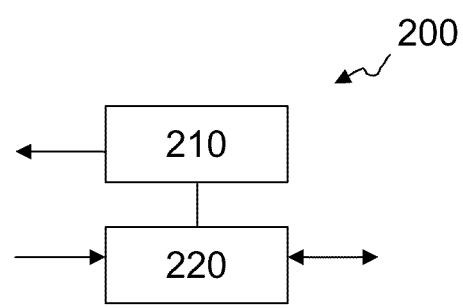
FIG. 5 shows a claimant according to an embodiment of the invention.

FIG. 5 shows an embodiment of a claimant (Cla) 200 according to the invention.

The property information supplying means 210 supplies a property information of the claimant to an evaluation device using a secured protocol. For example, the property information may be that the claimant belongs to the class of relay nodes.

When the claimant has received a key from the evaluation device, the establishing means 220 may establish a communication with an enforcement device different from the evaluation device based on the received key or a derivative thereof. If the establishing means 220 is successful in establishing the communication, the enforcement device 400 may grant access to a resource for the claimant 200.

Figure 6:
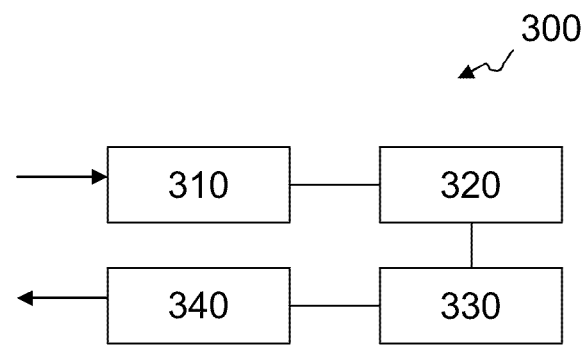
FIG. 6 shows an RVE according to an embodiment of the invention.

FIG. 6 shows an RVE 300 according to an embodiment of the invention.

The verification means 310 verifies whether a received device class information corresponds to a predefined device class. E.g., it may check if the device class information indicates a relay node. The device class information may be received from a backend server, such as a home subscriber server (HSS) in LTE.

The obtaining means 320 obtains a result, which is positive only if the device class information corresponds to the predefined device class as checked by the verification means. Alternatively, it may set a flag positive or perform some other logically equivalent operation.

The key generation means 330 generates a second claimant session key from a second claimant intermediate key stored in the apparatus.

The supplying means 340 supplies the second claimant session key and the result of the obtaining means to an enforcement device.

At least one of the key generation means 330 and the supplying means 340 generates and supplies, respectively, the second claimant session key only if the result is positive.

Figure 7:
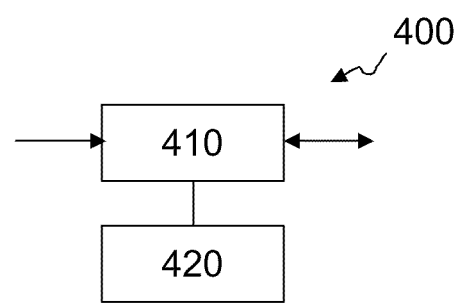
FIG. 7 shows an EnP according to an embodiment of the invention.

FIG. 7 shows an EnP 400 according to an embodiment of the invention.

The establishing means 410 establishes, with a claimant, a communication, which requires that a second claimant session key received from a verification device corresponds to an effective claimant session key of the claimant, wherein the verification device is different from the claimant.

One key corresponds to the other, if the latter can be derived from the former according to a predefined rule. Such a rule may include e.g. an identification of the respective device. In particular, in some embodiments, corresponding keys mean that one key matches the other key.

The granting means 420 grants access to a communication resource for the claimant only if a result received from the verification device is positive and if the establishing means established the communication.

Each of the LVE 100, Cla 200, RVE 300, and EnP 400 may comprise a storage such as a hard disk, a CD, a DVD, a random access memory (RAM) or a read-only memory (ROM), configured to store attributes, keys, program code etc. Furthermore, each of them may comprise one or more senders and receivers to communicate with the entities it is connected to.

The modules shown in FIGS. 4 to 7 are functional modules. Each of them may be based on a separate hardware, or some or all of them may be based on the same hardware. Furthermore, if they are realized in software, each of them may be realized by a separate program code, or some or all of them may belong to the same program code.

FIGS. 8 to 11 show details of the methods S810 to S840, respectively, according to embodiments of the invention.

Figure 8:
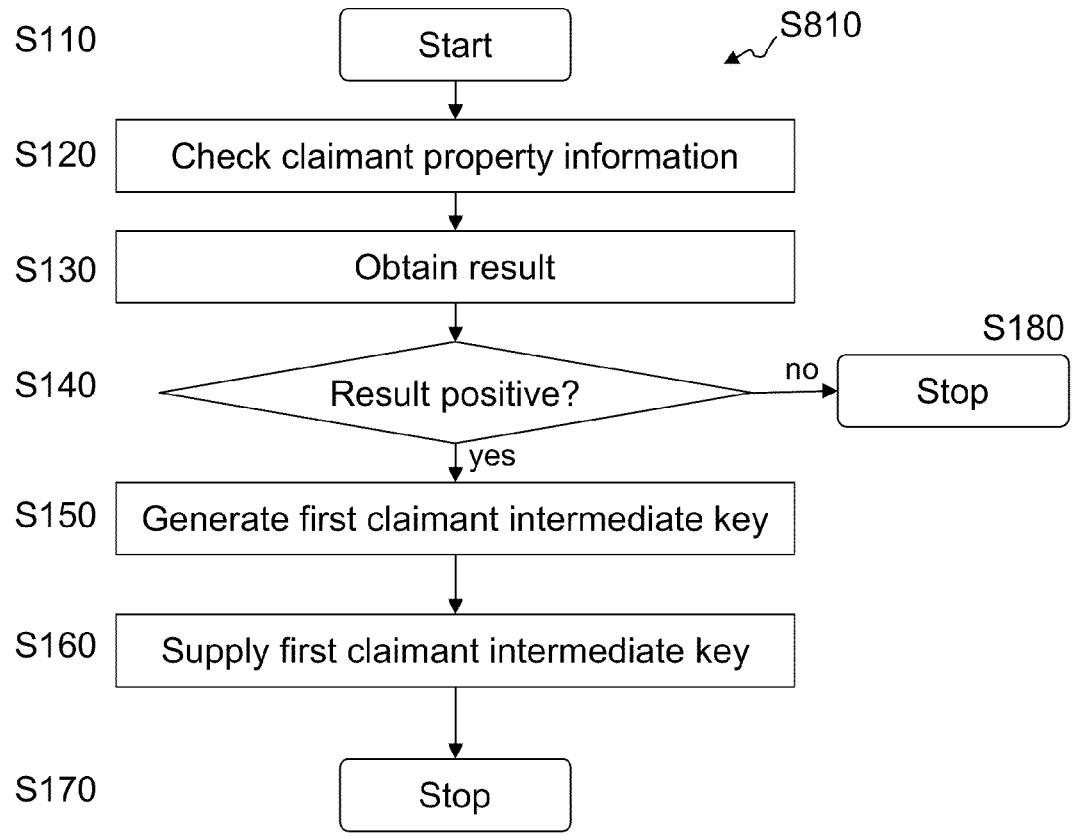
FIG. 8 shows a method of operation of an LVE according to an embodiment of the invention.

A method corresponding to step S810 of FIG. 3 according to an embodiment of the invention, which is preferably performed by an LVE such as LVE 100, is shown in FIG. 8:

In step S110, the LVE is initialized. In step S120, it checks whether a claimant property information received from a claimant device corresponds to a predefined claimant attribute. A result is obtained in step S130, which is positive only if the claimant property information corresponds to the predefined claimant attribute as checked in the checking step S120.

In step S140, it is checked if the result of the obtaining step S130 is positive or a logically equivalent condition such that a flag is true is fulfilled. If it is not, the method is stopped (S180).

Otherwise, according to step S150, a first claimant intermediate key is generated from a predefined claimant permanent key stored in the LVE. According to step 160, the first claimant intermediate key is supplied to the claimant using a secured protocol.

Alternatively or in addition, in some embodiments step S140 may be performed between steps S150 and S160.

Figure 9:
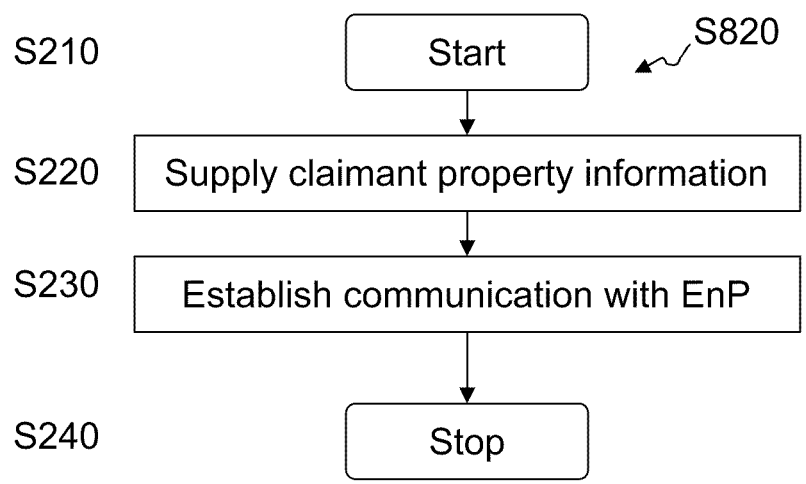
FIG. 9 shows a method of operation of a claimant according to an embodiment of the invention.

A method corresponding to step S820 of FIG. 3 according to an embodiment of the invention, which is preferably performed by a claimant such as claimant 200, is shown in FIG. 9:

According to step S210, the method is started, e.g. by initializing the claimant performing the method, performing self-checks, and obtaining attributes of the claimant. A property information of the claimant is supplied to the LVE using a secured protocol (step S220).

According to step S230, a communication is established with an entity other than the LVE, e.g. with an EnP. This communication is based on a session key which is based on a key received from the LVE. For example, the session key may be the same as that received from the LVE, or the Cla may generate the session key based on the key received from the LVE. Then, the method is terminated (step S240). That is, if the Cla successfully established the communication with the EnP, the latter might grant access to a resource for the claimant.

Figure 10:
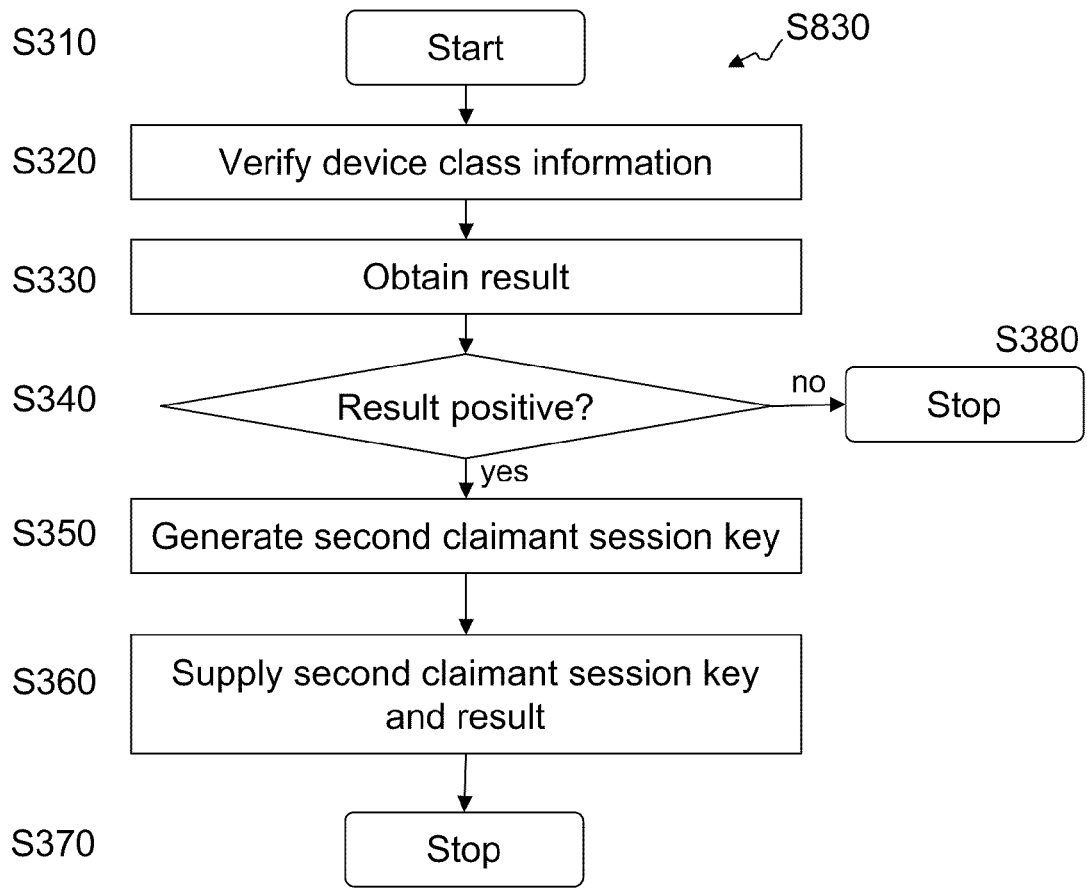
FIG. 10 shows a method of operation of an RVE according to an embodiment of the invention.

A method corresponding to step S830 of FIG. 3 according to an embodiment of the invention, which is preferably performed by an RVE such as RVE 300, is shown in FIG. 10:

In step S310, the method is initialized. For example, the RVE may receive a request to grant access to a resource from a device. The request comprises an identity that is related to the device, for example an identification of a USIM-RN. The RVE may retrieve from a backend server such as a home subscriber server (HSS) or an own database the class the device belongs to if this information is stored in the HSS or the own database.

In step S320, it verifies whether the received device class information property information corresponds to a predefined device class. A result is obtained in step S330, which is positive only if the received device class information corresponds to the predefined device class information as checked in the verifying step S320.

In step S340, it is checked if the result of the obtaining step S330 is positive or a logically equivalent condition such that a flag is true is fulfilled. If it is not, the method is stopped (S380).

Otherwise, according to step S350, a second claimant session key is generated from a second claimant intermediate key stored in the RVE. According to step 360, the second claimant session key and the result are supplied to the EnP, preferably using a secured protocol.

Alternatively or in addition, in some embodiments step S340 may be performed between steps S350 and S360.

In some implementations of a system according to an embodiment of the invention, the RVE does not provide the result to the EnP. For example, if it is a priori known that all Cla request a resource only by the local verification of the LVE, there is no need to forward the result to the EnP. Otherwise, however, if different types of Cla may request a resource, and some of them are not verified by the LVE, providing the result to the EnP may ensure that only verified Cla get access to the resource. This situation may happen e.g. during release upgrades.

Figure 11:
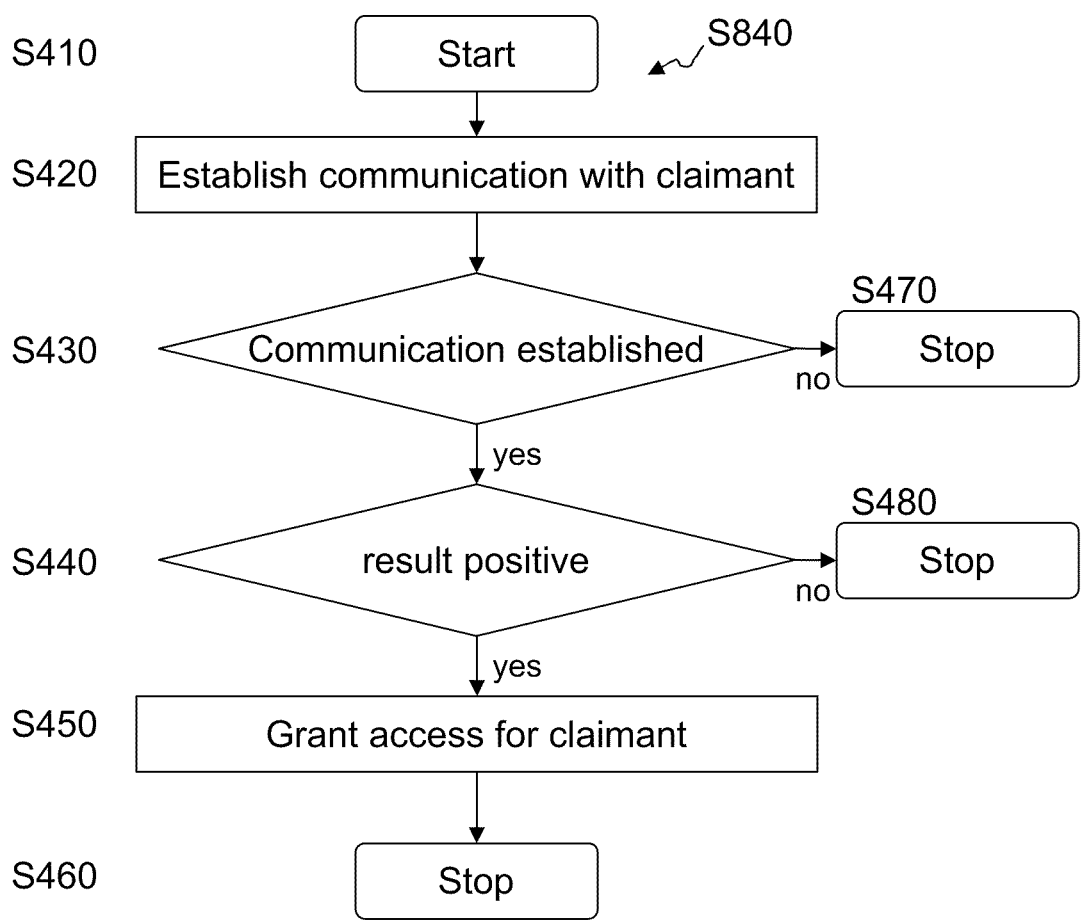
FIG. 11 shows a method of operation of an EnP according to an embodiment of the invention.

A method corresponding to step S840 of FIG. 3 according to an embodiment of the invention, which is preferably performed by an EnP such as EnP 400, is shown in FIG. 11:

According to step 5410, the method is started, e.g. by initializing the EnP performing the method, performing self-checks, etc.

In step 5420, a communication is established with the claimant. This communication requires that a second claimant session key received from an RVE corresponds to an effective claimant session key of the claimant. For example, in some embodiments the keys must match, in other embodiments the EnP generates a third claimant session key from the second claimant session key, and the former must match the effective claimant session key.

In step S430, it is checked whether the communication with the claimant Was successfully established. In step S440, it is checked whether the result or a corresponding flag received from the RVE is positive or if a corresponding logical condition is fulfilled such that a received flag is set). If one of these conditions is not fulfilled, the method is stopped (S470, S480).

Otherwise, according to step S450, the EnP grants access to the requested resource for the claimant. In step S460, the method is stopped.

As discussed with respect to the method 830 of the RVE (FIG. 10), step S440 of checking whether the result is positive may be omitted in some embodiments of systems according to the invention, if it is ensured that all claimants request a resource only by the local verification of the LVE.

Several variations of the above described methods and apparatuses are possible:

The connection between Cla and LVE may be secured and established by means of a certificate-based cryptographic protocol. Examples include internet key exchange (IKE), IKE version 2, and transport layer security (TLS).

The LVE may verify the attributes of the Cla by checking the authenticated identity of the Cla against a table with identities and their associated attributes. In this respect, the LVE may verify the attributes of the Cla by checking parameters in the certificate. The LVE may check the validity of the certificate of the Cla by means of OCSP (Online Certificate Status Protocol—RFC2560).

The LVE may contain a secure environment that does not allow an attacker extracting secret key material from the LVE.

The attributes characterizing class C may comprise at least one of the following: the presence of a secure environment that does not allow an attacker extracting secret key material from the member of C; the ability to perform an autonomous platform validation ensuring the integrity of the HW and SW realizing the member of C; the presence of functionality required of claimant such as a relay node.

The authentication and key agreement protocol between RVE and LVE may be EPS AKA, e.g. as defined in 3GPP TS 33.401.

The LVE may be comprised by a tamper resistant module such as a smart card, e.g. a UICC, or a part thereof. This has the advantage that the UICC with USIM may be considered as a secure computing environment that is considered trustworthy even in hostile environments.

The RVE may comprise the functions of an MME (as defined in 3GPP TS 33.401).

The EnP may comprise the functions of a DeNB (as defined in 3GPP TS 36.300).

The Cla may comprise the functions of a relay node (as defined in 3GPP TS 36.300).

The session keys, or any derivatives thereof, may comprise CK, IK, $K_{ASME}$ and any of the keys derived from them, e.g. according to 3GPP TS 33.401.

The session keys, or any derivatives thereof, may be used to protect an interface between Cla and EnP and/or an interface between Cla and RVE.

The protocol run between Cla and RVE may convey an identity of the Cla to the RVE. The identity should be unique within the network or a relevant sub-section of the network the Cla belongs to.

Detailed Implementations of a Relay Node Architecture

A first detailed implementation in the context of a relay node architecture in EPS according to an embodiment of the invention is described hereinafter, wherein the MME and the Donor eNB (DeNB) may be compliant with e.g. 3GPP TS 36.300.

The following is assumed:

Cla is a relay node (RN). LVE is a UICC containing the USIM, called USIM-RN, which the RN uses in performing the RN attach procedure as defined in 3GPP TS 36.300. RVE is an MME, called MME-RN, which performs the RN attach procedure with the RN. EnP is a DeNB. This system corresponds to that shown in FIG. 2.

There may be a secure connection between LVE and Cla, which is a secure channel between USIM-RN and RN using e.g. TLS as defined in ETSI TS 102 484 "Smart cards; Secure channel between a UICC and an end-point terminal".

Class C may be defined by at least one of the following properties of its members:
 is a relay node;
 has a secure environment containing the private TLS key;
 performs an autonomous platform validation before establishing a secure channel e.g. according to ETSI TS 102 484;
 prevents unauthorized access to session keys, or any derivatives thereof;
 provides the correct identity to the MME-RN upon request.

The authentication and key agreement protocol between MME-RN and USIM-RN on the UICC may be EPS AKA (as defined in TS 33.401). The resource request may be an RN attach procedure.

The procedure then comprises the steps described below. If one of the steps fails in any of the involved entities the procedure may be aborted by that entity.

Procedures Prior to the RN Attach Procedure

E1. The RN may perform an autonomous validation of the RN platform. The RN may then attach to the network in its role as a UE and establish IP connectivity using a USIM called USIM-INI. This establishment does not constitute an RN attach procedure.

E2. The RN optionally obtains an operator certificate through the enrolment procedures defined e.g. in TS 33.310.

E3. The RN optionally establishes a secure connection to an OAM server.

E4. The RN and the USIM-RN may establish a TLS connection using certificates on both sides, or only on the RN side, e.g. according to the Secure Channel mechanism specified in ETSI TS 102 484. The RN may use a pre-established certificate or the certificate enrolled in step E2. The private key corresponding to the RN certificate may be stored in the secure environment of the RN platform validated in step E1, and the TLS connection terminates there. From this step onwards, all communication between the USIM-RN and the RN may be protected by the secure channel.

E5. An OCSP client according to e.g. IETF RFC 2560 on the UICC may check the validity of RN certificate used in the secure channel set-up with an OCSP server. The OCSP communication need not be sent through the secure channel between USIM-RN and RN as OCSP is self-secured, but there would be no harm in doing so. Note that the OCSP client may reside on the UICC, but, by definition of a USIM, is not part of a USIM. Hence, sending OCSP communication outside the secure channel would not contradict the last sentence of E4.

E6. The RN may detach from the network if it has attached for performing steps E2, E3, or E5 and may delete the EPS security context in the RN and the USIM-INI, if any.

Steps E1 to E5 correspond to step 1.1 of the method generally described above.

By step E6, it is ensured that no EPS security context exists in the RN or the USIM-RN immediately prior to the RN attach procedure.

RN Attach Procedure

The RN may perform the RN attach procedure for EPS as defined in TS 36.300. From a security point of view, this may involve the following steps:

A1. The RN may use the international mobile subscriber identity (IMSI) (or a related globally unique temporary identity, GUTI) pertaining to the USIM-RN in the RN attach procedure. This step is part of step 1.2 of the method generally described above.

A2. The MME-RN may initiate EPS AKA with the RN and the USIM-RN and may establish NAS security. This step corresponds to a part of step 1.2 and to step 1.3 of the method generally described above.

A3. The MME-RN may check from the RN-specific subscription data received from the HSS that the USIM-RN is allowed to be used in RN attach procedures. The MME-RN may communicate this fact to the DeNB in an extended S1 INITIAL CONTEXT SETUP message. This step corresponds to step 1.4 of the method generally described above.

A4. Upon receipt of the extended S1 INITIAL CONTEXT SETUP message, the DeNB may set up RN-specific access stratum (AS) security over Un, which differs from AS security over Uu in the provision of integrity protection for PDCP frames carrying S1/X2 messages. This step corresponds to step 1.5 of the method generally described above.

The RN start-up is now complete from a security point of view, and UEs may start attaching to the RN.

USIM Aspects

The support of the secure channel mechanism may require the USIM-RN to use a certificate. This certificate is preferably pre-installed in the UICC by the operator.

The certificate shall allow limiting its use to USIMs in the context of relay node architectures (e.g. through a suitable name structure, or a particular intermediate CA in the verification path, or an attribute, e.g. in the OID field.)

Enrolment Procedure for RNs

The RN may enrol a device certificate as with macro eNBs according to e.g. 3GPP TS 33.310 prior to the RN attach procedure with the DeNB. This certificate may then be used for establishing the secure channel between RN and USIM.

The certificate enrolment procedure may not rely on the security at the AS level, but may be secured at the application layer. Therefore, it may be executed before security on the Un interface has been established. However, the RN may require IP connectivity for the enrolment procedure to be able to reach the Registration Authority (RA). The IP connectivity could be established in one of various ways, e.g.:

(1) The RN may attach to a fixed network for enrolment purposes. No USIM is required.

(2) The RN may attach to an eNB using a USIM, called USIM-INI, different from the one used in the RN attach procedure to the DeNB, called USIM-RN. No secure channel between RN and USIM-INI is required, but the USIM-RN shall communicate with any terminal only via a secure channel with OCSP-checked terminal certificate. Having two USIMs on one UICC is a standard feature available today. It is sufficient that only one USIM can be active at a time.

In both cases, the network should preferably ensure that the destinations the RN can reach are restricted, e.g. to only the RA, the OAM server, and the OCSP server, if the communication with the RA occurs prior to the RN attach procedure. In case of (2) this could be ensured e.g. by restricting IP traffic originating from the RN and sent over a packet data convergence protocol (PDCP) without integrity protection to only certain destinations (access point names, APNs). The present scenario is not restricted to a specific implementation of the restriction.

Secure Management Procedures for RNs

The RN may establish a secure connection to an OAM server.

The operation and maintenance (OAM) procedure may not rely on the security at the AS level. It may therefore be executed before security on the Un interface has been established. If no security on lower layers is available the communication between RN and OAM server would be typically secured using TLS. The RN requires IP connectivity for this procedure to be able to reach the OAM server. The IP connectivity could be established in the same ways as described above.

Restrictions on the destinations the RN can reach must apply if the communication with the OAM server occurs prior to the RN attach procedure. They can be realized similar to what is described above.

OCSP Checks by the UICC

The detailed implementation presented hereinabove may require the UICC to perform an OCSP check of the RN certificate used for the set up of the secure channel prior to the RN attach procedure with the DeNB. The OCSP protocol is self-secured and may therefore be executed before security on the Un interface has been established. The OCSP client may need to send the IP packets carrying the OCSP message via the RN. The RN therefore may require IP connectivity for this procedure to be able to reach the OCSP server. The IP connectivity may be established in the same way as described above.

As an alternative or additionally to the OCSP mechanism, the MME-RN may make the access control by itself, thus not depending on an external OCSP server, or use certification revocation list (CRL).

A second detailed implementation in the context of a relay node architecture in EPS according to an embodiment of the invention is described hereinafter. It shares the assumption with and follows the steps of the detailed implementation described above, except that it differs from it in at least the following respects:

E1. The IP connectivity may be established using the USIM-RN. This establishment does not constitute an RN attach procedure. The USIM-RN may be suitably modified such that, whenever the USIM-RN is used outside an RN attach procedure, the USIM-RN generates a modified claimant intermediate key that is different from the first claimant intermediate key and transfers it to the RN.

A1. The RN may be suitably modified such that, whenever the attach procedure does not constitute an RN attach procedure, the RN indicates this fact to the MME-RN as part of the attach procedure.

A3. The MME-RN may be suitably modified such that, whenever it receives an indication from the RN that the attach procedure does not constitute an RN attach procedure, the MME-RN generates a second modified claimant intermediate key that is different from the second claimant intermediate key and transfers it to the DeNB.

Enrolment Procedure:

USIM-RN is used instead of USIM-INI.

According to the above description, it should thus be apparent that exemplary embodiments of the present invention provide, for example a local verification entity such as a smart card, or a component thereof, an apparatus embodying the same, a method for controlling and/or operating the same, and computer program(s) controlling and/or operating the same as well as mediums carrying such computer program(s) and forming computer program product(s). Further exemplary embodiments of the present invention provide, for example a claimant such as a relay node, or a component thereof, an apparatus embodying the same, a method for controlling and/or operating the same, and computer program(s) controlling and/or operating the same as well as mediums carrying such computer program(s) and forming computer program product(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

We claim:

1. An apparatus, comprising:
   a hardware processor configured to supply a claimant property information of the apparatus to an evaluation device using a secured protocol;
   a hardware processor configured to establish a communication with an enforcement device different from the evaluation device based on an effective claimant session key, wherein the effective claimant session key is based on a first claimant intermediate key received by the apparatus from the evaluation device, the first claimant intermediate key having been generated by the evaluation device based on a securely stored predefined claimant permanent key stored by the evaluation device.

2. The apparatus according to claim 1, wherein the secured protocol is a cryptographic protocol based on a certificate.

3. The apparatus according to claim 2, wherein the claimant property information is comprised in the certificate.

4. The apparatus according to claim 1, wherein the claimant property information comprises information whether or not at least one of the following items is fulfilled:
   a presence of a secure storage in the apparatus, wherein the secure storage is configured to securely store a key of the secured protocol such that extraction of the key from the apparatus requires a corresponding authorization;
   an ability to perform an autonomous platform validation ensuring the integrity of a hardware and a software of the apparatus; and
   a predefined functionality apart from the presence and the ability is provided by the apparatus.

5. The apparatus according to claim 1, further comprising:
   a key generator configured to generate an effective claimant session key from the first claimant intermediate key, and wherein
   a hardware processor is configured to establish the communication with the enforcement device using the effective claimant session key.

6. The apparatus according to claim 5, wherein said apparatus is configured to protect the communication with the enforcement device based on the effective claimant session key.

7. A relay node, comprising an apparatus according to claim 1.

8. A method, comprising:
   supplying a claimant property information of an apparatus performing the method to an evaluation device using a secured protocol;

establishing communication with an enforcement device different from the evaluation device based on an effective claimant session key, wherein the effective claimant session key is based on a first claimant intermediate key received by the apparatus from the evaluation device, the first claimant intermediate key having been generated by the evaluation device based on a securely stored predefined claimant permanent key stored by the evaluation device.

9. The method according to claim 8, wherein the secured protocol is a cryptographic protocol based on a certificate.

10. The method according to claim 9, wherein the claimant property information is comprised in the certificate.

11. The method according to claim 8, wherein the claimant property information comprises information whether or not at least one of the following items is fulfilled:

a presence of a secure storing means in the apparatus, wherein the secure storing means is configured to securely store a key of the secured protocol such that the extraction of the key from the apparatus requires a corresponding authorization;

an ability to perform an autonomous platform validation ensuring the integrity of a hardware and a software of the apparatus; and a predefined functionality apart from the presence and the ability is provided by the apparatus.

12. The method according to claim 8, further comprising:

generating an effective claimant session key from the first claimant intermediate key, and wherein the establishing uses the effective claimant session key to establish the communication with the enforcement device.

13. The method according to claim 12, further comprising protecting the communication with the enforcement device based on the effective claimant session key.

* * * * *